(12) United States Patent
Remón Higuera et al.

(10) Patent No.: US 10,443,574 B2
(45) Date of Patent: Oct. 15, 2019

(54) GRAVITY FOUNDATION FOR THE INSTALLATION OF OFFSHORE WIND TURBINES

(71) Applicants: DRACE INFRAESTRUCTURAS, S.A., Madrid (ES); DRAGADOS, S.A., Madrid (ES)

(72) Inventors: Jaime Remón Higuera, Madrid (ES); Carlos Jesús Polimón Olabarrieta, Madrid (ES); Noelia Gonzalez Patiño, Madrid (ES); Miguel Vázquez Romero, Madrid (ES)

(73) Assignees: DRACE INFRAESTRUCTURAS, S.A., Madrid (ES); DRAGADOS, S.A., Madrid (ES)

( * ) Notice: Subject to any disclaimer, the term of this patent is extended or adjusted under 35 U.S.C. 154(b) by 0 days.

(21) Appl. No.: 15/560,887

(22) PCT Filed: Mar. 27, 2015

(86) PCT No.: PCT/ES2015/070231
§ 371 (c)(1),
(2) Date: Sep. 22, 2017

(87) PCT Pub. No.: WO2016/156624
PCT Pub. Date: Oct. 6, 2016

(65) Prior Publication Data
US 2018/0119675 A1    May 3, 2018

(51) Int. Cl.
*E02B 17/02* (2006.01)
*E02B 17/00* (2006.01)
(Continued)

(52) U.S. Cl.
CPC .......... *F03D 13/25* (2016.05); *E02B 17/024* (2013.01); *E02D 27/42* (2013.01); *E02D 27/425* (2013.01);
(Continued)

(58) Field of Classification Search
CPC ....... B63B 35/003; B63B 43/06; E02B 17/00; E02B 17/02; E02B 2017/0039;
(Continued)

(56) References Cited

U.S. PATENT DOCUMENTS 2,657,540 A * 11/1953 Templeton .............. E02B 17/00
405/209
3,091,937 A * 6/1963 Thompson .............. E02B 17/00
405/204
(Continued)

FOREIGN PATENT DOCUMENTS

ES      2378960 A1    4/2012
GB      2017794 A     10/1979
(Continued)

*Primary Examiner* — Benjamin F Fiorello
*Assistant Examiner* — Edwin J Toledo-Duran
(74) *Attorney, Agent, or Firm* — Aslan Law, P.C.

(57) ABSTRACT

A gravity-based foundation for the installation of offshore wind turbines, manufactured in a floating dock for towing to the final destination thereof, where it is anchored and finally completely submerged below sea level, comprising a concrete floating caisson, in the shape of a prism, with a hexalobular base, divided into several cells by at least one partition with a significantly circular cross section, concentric with a central cell, determining inner vertical cells interconnected with each other and with the exterior, which is closed at the top by a cover or covers that are removed once the foundation is anchored before being filled with a ballast material.

20 Claims, 3 Drawing Sheets

(51) Int. Cl.
*F03D 13/25* (2016.01)
*E02D 27/42* (2006.01)

(52) U.S. Cl.
CPC ... *E02B 17/0004* (2013.01); *E02B 2017/0069* (2013.01); *E02B 2017/0091* (2013.01); *F05B 2240/95* (2013.01); *F05B 2240/97* (2013.01); *F05B 2250/141* (2013.01)

(58) Field of Classification Search
CPC ..... E02B 2017/0043; E02B 2017/0073; E02B 2017/0082
USPC ................ 405/195.1–210, 222–228
See application file for complete search history.

(56) References Cited

U.S. PATENT DOCUMENTS

| | | | | |
|---|---|---|---|---|
| 3,516,259 A * | 6/1970 | Tokola | ............... | E02B 17/0013 405/208 |
| 3,537,268 A * | 11/1970 | Georgii | ................. | B65D 88/78 114/264 |
| 3,708,987 A * | 1/1973 | Roulet | ................... | B65D 88/78 405/205 |
| 3,793,840 A * | 2/1974 | Mott | ....................... | E02B 17/02 405/211 |
| 3,879,952 A * | 4/1975 | Mo | ....................... | E02B 17/025 405/207 |
| 3,906,735 A * | 9/1975 | Mo | ....................... | E02B 17/025 114/65 A |
| 3,961,489 A * | 6/1976 | Mo | ....................... | E02B 17/025 405/207 |
| 3,969,900 A * | 7/1976 | Plodowski | ............... | E02B 3/06 405/23 |
| 4,014,177 A * | 3/1977 | Jarlan | .................. | E21B 43/017 114/257 |
| 4,087,984 A * | 5/1978 | Mo | ....................... | E02B 17/025 405/207 |
| 4,126,010 A * | 11/1978 | Michel | ................... | B63B 9/065 405/202 |
| 4,155,671 A * | 5/1979 | Vos | ....................... | E02B 17/025 405/203 |
| 4,188,157 A * | 2/1980 | Vigander | ............... | E02B 17/025 405/207 |
| 4,241,685 A * | 12/1980 | Mougin | .............. | B63B 35/4413 114/264 |
| 4,266,887 A * | 5/1981 | Corder | .................. | E02B 17/021 405/196 |
| 4,422,803 A * | 12/1983 | Wetmore | .............. | E02B 17/025 405/204 |
| 4,470,725 A * | 9/1984 | Kure | ................... | E02B 17/0021 405/212 |
| 4,484,841 A * | 11/1984 | Einstabland | ........ | E02B 17/0021 405/195.1 |
| 4,666,341 A * | 5/1987 | Field | ...................... | B63B 35/10 114/40 |
| 4,674,919 A * | 6/1987 | Olsen | .................... | E02B 17/025 405/207 |
| 4,906,138 A * | 3/1990 | Barbaras | ............. | E02B 17/0021 405/207 |
| 4,963,058 A * | 10/1990 | Broughton | .......... | E02B 17/0017 405/14 |
| 4,969,776 A * | 11/1990 | Bunce | .................. | E02B 17/021 405/197 |
| 8,534,958 B2 * | 9/2013 | Reichel | .................... | E02B 17/02 405/205 |
| 9,567,720 B2 * | 2/2017 | Wong | ...................... | E02B 17/00 |
| 2003/0140838 A1* | 7/2003 | Horton, III | ............. | B63B 9/065 114/264 |
| 2006/0062676 A1* | 3/2006 | Jakubowski | ............ | B63B 35/44 416/244 R |
| 2009/0126616 A1* | 5/2009 | Srinivasan | .............. | B63B 35/44 114/264 |
| 2011/0107951 A1* | 5/2011 | Vandenworm | .......... | B63B 1/041 114/125 |
| 2016/0138239 A1* | 5/2016 | Lvarez Grac A-Luben | ................ | E02D 23/00 405/13 |

FOREIGN PATENT DOCUMENTS

WO    WO 2009/130343    10/2009
WO    WO 2014060650 A2    4/2014

\* cited by examiner

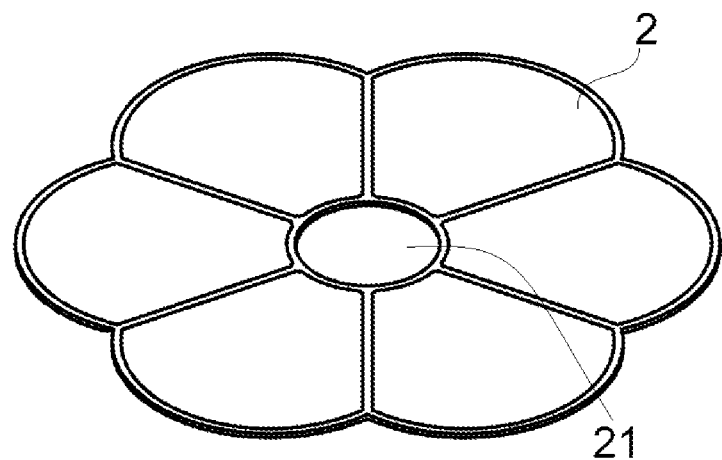
Fig. 2
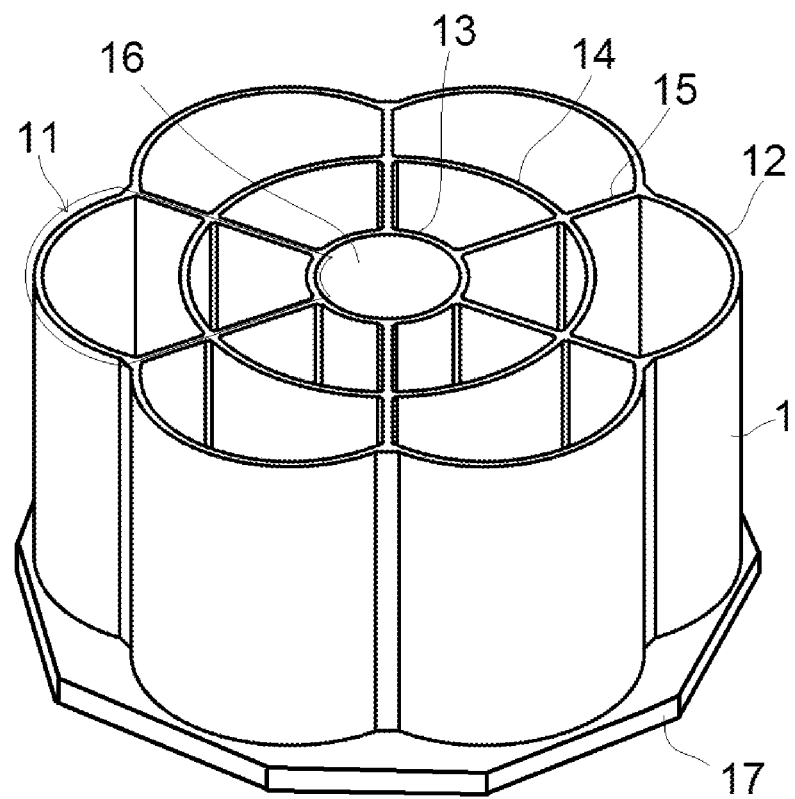

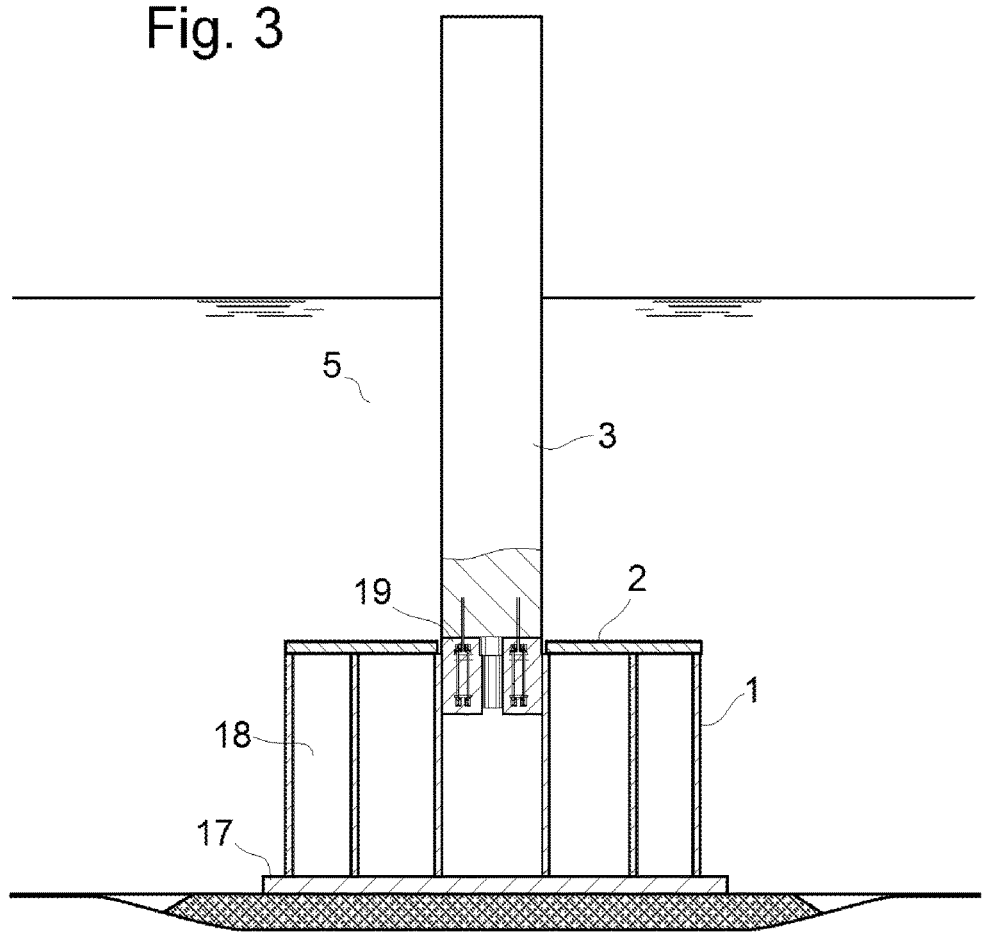

GRAVITY FOUNDATION FOR THE INSTALLATION OF OFFSHORE WIND TURBINES

OBJECT OF THE INVENTION

The invention relates to a gravity-based foundation for the installation of offshore wind turbines and meteorological towers, which is manufactured in a floating dock for towing to its final location, where it is anchored and finally completely submerged below sea level, with a shaft or structure protruding therefrom, which supports the wind turbine or offshore infrastructure.

STATE OF THE ART

The industrial sector dedicated to renewable marine energies is growing at a high rate in Europe, specifically offshore wind energy, since this type of energy can help to meet the growing demand for electric power with minimal environmental impact. The main limiting factor in the development of this sector is the depth at which the offshore structures of wind turbines must be cemented. Since they have to be located far from the coast, generally the depth at which the wind farm is finally located can reach important figures depending on the location and the geotechnical characteristics of the seabed. This is why extensive studies of the foundations that are to be selected as a solution are necessary.

There are currently two types of offshore structures: fixed structures and floating structures. The foundations of fixed structures are further classified into different types: monopile foundations, gravity-based foundations and tubular metal foundations. These types of foundations require ships and special means for their transport and installation.

Monopile-type foundations are typically made up of three elements: the steel pile, which is driven into the seabed, a transition piece that serves as a fixture for the superstructure and a platform for accessing the tower or wind turbine structure. This solution is more economical for shallower depths and soils with geotechnical characteristics that allow penetration.

Gravity-based foundations are large concrete or steel foundations that secure offshore structures through their own weight, providing stability to the whole by transmitting the loads directly to the ground. They are usually frustoconical or cylindrical in shape and their installation requires prior preparation of the seabed and a special ship for transport to the final location.

Fundamentally, tubular foundations can be tripods or lattice-type frames. These foundations can be used at greater depths and are suitable for larger offshore structures, with the consequent increase in economic cost. These types of foundations require ships and special means for their transport and installation.

On the other hand, port caissons manufactured on floating docks are very well known. These are large reinforced concrete structures that are able to float once completed due to their lightened (multicellular) cross section. This makes them highly versatile in terms of construction (using the slipform technique), floating transport, and placement (anchoring) at the port works site, for docks, breakwaters, or other structures. Caisson breakwaters (protective works) and docks (mooring works) are specially used in Spanish ports, the manufacture of which by means of floating docks is well known in Spain, and the applicant companies are international leaders in the technology of slipform reinforced concrete construction of caissons on floating docks because they have built more than 3,000 units to date.

In general, port caissons have a parallelepiped shape with a rectangular or square floor plan, although in some special cases, caissons with other shapes have been used in order to adapt to the constraints of each project.

INNEO document ES 2 378 960 describes a gravity-based foundation structure for marine wind turbines, with a frustoconical base, which cannot use slipforming on a floating dock and which lacks the auxiliary buoyancy structures that are required to maintain the stability of the whole during the phases of the anchoring process.

Document WO 2009/130343 by ACCIONA WIND-POWER describes a supporting element for an offshore wind turbine, consisting of a reinforced concrete caisson that can be built on a floating dock as a gravity-based foundation. However, the upper part of the caisson remains exposed, so the solution limits its range of application in terms of drafts, a condition imposed by the capacities of existing floating docks, and the drafts required on the manufacturing docks. The caisson does not fully submerge during any of the anchoring phases (it maintains the same anchoring procedure of conventional port caissons) thus avoiding critical phases at the expense of substantially increasing wave loads during the service phase, because the waves impact directly on the caisson. This increase in applied loads also generates a significant increase in materials (concrete, steel, and filler), in order to provide stability against said loads. On the other hand, the caisson has a rectangular or square, rather than a circular, floor plan, which results in a significant increase in wave loads.

DESCRIPTION OF THE INVENTION

The invention intends to solve the problem of building a foundation at greater depths and with heterogeneous soil characteristics for offshore structures, minimizing costs and optimizing the construction sequence. A mixed solution is suggested for foundations comprising a CGF (Concrete Gravity Foundation) based on a hexalobular watertight caisson, plus a metal or concrete shaft or a metal lattice (jacket).

The manufacture of this caisson is to be carried out in a floating dock, a construction technique that is strongly established in Spain, and, in fact, it has been successfully applied both in the construction of docks and other mooring structures, vertical seawalls, etc. Port caissons are large reinforced concrete structures that are able to float once completed due to their lightened (multicellular) cross section, which makes them highly versatile in terms of construction (using the slipform technique) floating transport and placement (anchoring) at the port works site for docks, breakwaters or other structures. In general, port caissons have a parallelepiped shape with a rectangular or square floor plan, although in some special cases, caissons with other shapes have been used in order to adapt to the constraints of each project.

The suggested solution for the foundation therefore consists of three elements: the concrete foundation itself, a metal (or concrete) shaft, or a lattice and joining element between the wind turbine superstructure or offshore infrastructure and the foundation.

The foundation consists of a floating concrete caisson in the shape of a straight prism closed at its base, provided with vertical inner cells interconnected with each other and with the exterior, equipped with emptying and filling devices which enables self-regulation of the ballast level for anchoring at its final location. The caisson is closed by means of at least one cover, which can be removed after anchoring the foundation. It also has at least one concrete node in at least one of the cells of the caisson, which defines means of connection of a shaft or structure that joins the caisson to the superstructure, to which in turn the wind turbine or offshore infrastructures is fastened.

According to the present invention, said caisson has a lobular cross section, in a circular arrangement, wherein each of said lobes has a trapezoidal configuration with a curved-convex outer side, while the inner side is a portion of a partition that defines a significantly circular central cell. Each of these lobes is divided into cells by at least one partition wall with a significantly circular cross section. It has been foreseen that the radius of curvature of each of the lobes into which the floor plan is divided is smaller than that of the body of the foundation, determining this overall lobular aspect.

The closing cover or covers have a configuration that is equivalent to the caisson or to each of said lobes and a support on said caisson that enables the removal of the cover or covers once the foundation is anchored, before being filled with a ballast material.

It has been foreseen that the number of lobes that make up the floor plan of the caisson, which makes up the foundation, be comprised of between 5 and 8 lobes, 6 being considered an optimal number, which could thus define the caisson floor plan as being hexalobular.

The base of the caisson has a polygonal floor plan, thicker than the wall of the caisson. This base usually protrudes slightly from the bottom of the caisson and has a polygonal configuration in order to make it easier to manufacture, acting as a counterweight with the aim of lowering the center of gravity, thus allowing great flotation stability during transfer or in anchoring operations.

In principle it has been foreseen that when the closing cover is an object covering the entire caisson, it should also cover the central cell; however an embodiment in which there is a central window in correspondence with this cell is also possible. When several closing covers are used, these will correspond to the lobes that make up the caisson and will not cover the central cell; this way it is feasible to fasten the mast first before sinking the foundation, without detriment of being able to remove the covers one by one once the caisson is anchored.

The shaft used can be metallic or made of concrete, in any case it is anchored in the central cell of the caisson, such that is acts as a foundation plinth of the meteorological tower or wind turbine superstructure. The connection is carried out by means of a concrete node and prestressed bars. A jacket-type or lattice structure can also be used, in which case the assembly to the caisson is carried out with the same type of connection but with various nodes conveniently distributed in the different cells of the caisson. The mooring area or pier, as well as access stairs and intermediate platforms, can be arranged in both the shaft and the lattice.

On the other hand, the connection element of the foundation with the superstructure is a metal platform that is joined both to the shaft and the superstructure (tower of the wind turbine), and that ends in a work surface on which maintenance equipment, instrumentation and auxiliary elements for operations can be arranged. In addition, this element is designed to establish a working platform that enables the circulation of operation, auxiliary power supply installations and safe access from the shaft, even including the lifting of materials from the platform.

The design of this foundation is based on three main aspects: structural design, adapted to the stresses in the service phase, hydraulic design, enabling optimal behavior in flotation and against the loads created by the waves and the surf, and finally, in functional aspects, facilitating final ballast and possible emptying for the removal of the unit at the end of useful life.

The structural design implies a novel application of horizontally supported arches that enable the transmission of stresses through nodes of three walls in equilibrium, eliminating critical structures. This arrangement allows structural optimization, simplifying the assembly of the walls, reducing the required amounts of steel and facilitating the installation thereof by avoiding most of the 90° nodes. The inner structure favors efficient distribution of stresses from the central substructure towards the base. In addition, the floor plan entails an increase in the support surface on the base.

With reference to the hydraulic and naval characteristics, the floor plan of the caisson allows increasing the buoyancy of the caisson and combined with the weight saving in the shaft, lowering the center of gravity thus increasing stability. The shape also enables increasing the inertia of flotation of the structure, providing smaller drafts at launch, which allows reducing the requirements in terms of depth at the point of manufacture. The rounded shape of the lobes favors the flow of water, reducing drag during navigation and the thrust exercised by waves and currents. The working face, more accentuated by the curvature of each lobe, and the smoothness of the flanks to the flow of the water, contribute to this fact.

The last group of improvements provided by this foundation come from the functional aspects thereof: the absence of a fixed deck, which allows filling the caisson with ballast material through a multitude of means, from hydraulic filling with a dredge to pouring with a bucket or pouring of quarry material through piping. The accessibility of the cells enables ensuring the possibility of emptying the same at the end of the useful life thereof, for subsequent refloating of the caisson, which allows avoiding any permanent damage to the means of implantation.

In order to ensure that the mooring process is carried out autonomously and without the intervention of divers, each of the inner cells of the caisson is connected to a series of adjoining cells forming filling areas that are independent to each other, each of which has at least one access duct with the exterior, interposing in said accesses devices that allow or do not allow the passage of fluid during mooring operations.

The concrete or metallic shaft or lattice-type structure that joins to the caisson and supports the wind turbine or the meteorological tower has a metallic connection element between it and the superstructure or said wind turbine or meteorological tower. Optionally, it also has an upper mooring area or pier, rest platforms and access stairs as well as a maintenance and instrumentation platform.

In summary, this foundation has certain remarkable advantages:

- The geometric shape of the foundation caisson, with straight walls, renders it easily executable in a caisson box, a well known and standardized technique commonly used in the maritime-port sector, which minimizes costs and increases the rate of production.
- Its draft is smaller than that of other foundations of this type, which enables manufacturing it at a greater number of sites.
- It also uses less concrete and significantly reduces the amount of steel per foundation.

It has a larger base thus improving support on the ground.

It is more stable, reducing the overall size of the foundation.

It navigates better thus saving fuel for tugboats.

It saves material and construction time due to the absence of a permanent upper deck.

The use of a removable cover or covers enables navigation and anchoring, and, once the foundation has been anchored, it enables removing the cover, facilitating filling the cells from the exterior with different ballast materials, easily by pouring directly or through piping.

It enables removal of the caisson after useful life.

It can be used at intermediate depths (from 20 m to 60 m).

The verticality of the overall structure (meteorological tower or wind turbine) is ensured through the use of a metallic connection element, with regulation capacity, between the metallic shaft or jacket and the superstructure.

It is a simple solution, which does not require lifting equipment or special boats, as it is a floating foundation that can be transported by standard tugboats.

The method of construction is standardized and well known, since it is the same as for the caissons commonly used in maritime and port works.

The stockpiling of all the units that are manufactured can be carried out at sea, without having to occupy land surface.

DESCRIPTION OF THE DRAWINGS

To complement to the description, and for the purpose of helping to make the characteristics of the invention more readily understandable, the present specification is accompanied by a set of drawings, which by way of illustration and not limitation, represent the following:

FIG. 2 corresponds to a view of the caisson (1) with a single cover (2) used for towing and anchoring processes and which can be removed after the foundation is positioned at the location thereof.

FIG. 3 is a cross-sectional view along a vertical plane passing through the central cell (16) of the caisson (1) in which a node (19) locking the shaft (3) is formed, making up the support structure of the wind turbine together with the foundation (1).

PREFERRED EMBODIMENT OF THE INVENTION

Figure 1:
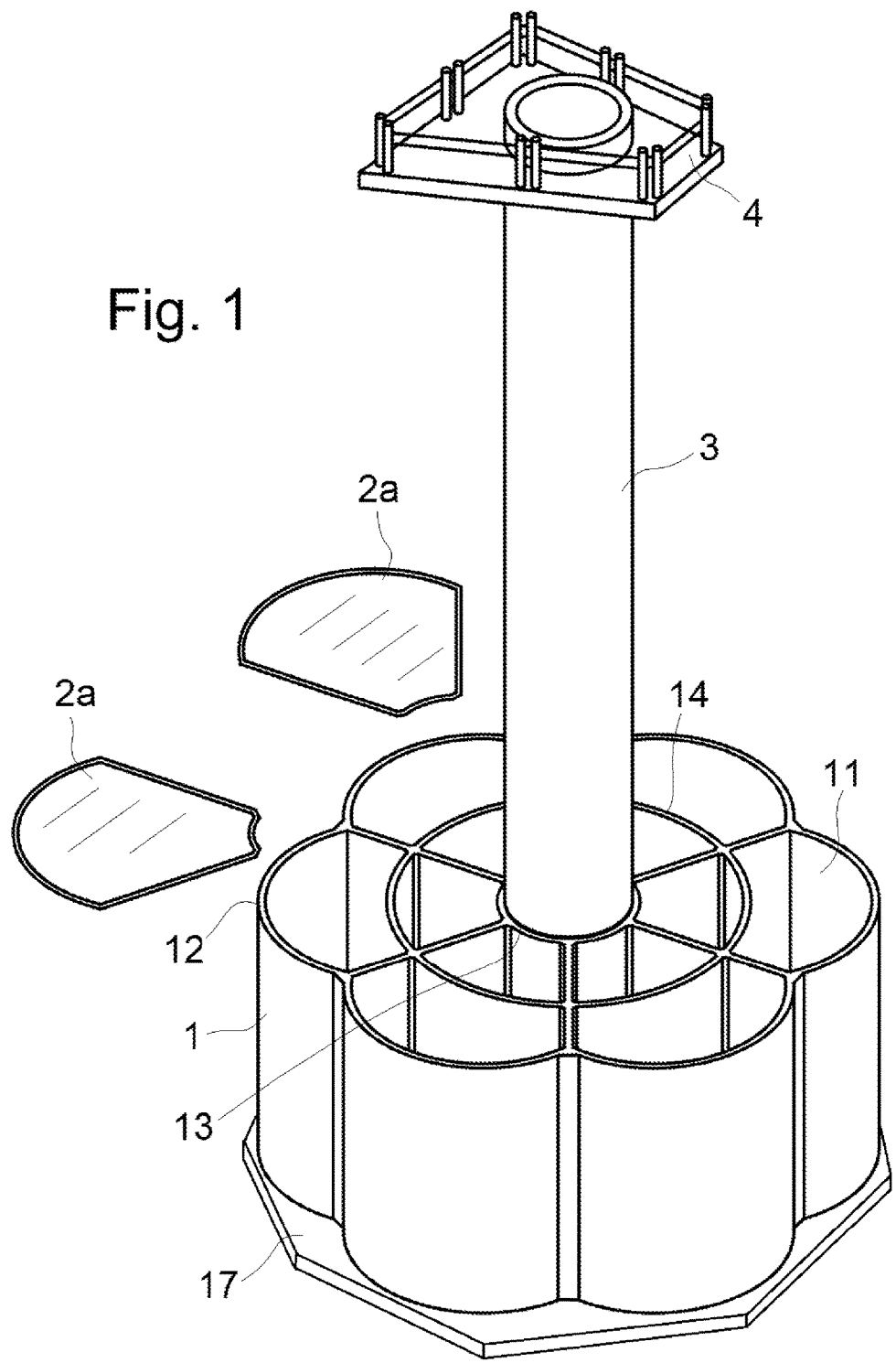
FIG. 1 shows a general perspective view of the support structure of a wind turbine or meteorological tower in which the caisson (1) is closed on top by several removable covers (2a).

FIG. 1 enables distinguishing the three parts that make up the support structure of the wind turbine or the meteorological tower, namely:

a) A concrete caisson (1), lightened with inner cells interconnected with each other and with filling and emptying devices that enable ballasting and de-ballasting, said caisson being the foundation that supports the structure of the offshore wind turbine.

b) A metallic or concrete shaft (3), which connects the foundation (1) with a connection element (4) located at the upper end, on which the mooring area or pier, rest platforms and stairs are arranged.

c) A connection element (4) between the shaft (3) and the wind turbine superstructure, which optionally has a maintenance platform and the necessary instrumentation for the operation of the wind turbine.

The concrete caisson (1) represents the basis of the invention and can be seen in detail in all the attached figures. The caisson is manufactured in a port using a caisson box or floating dock, which has a slipform system like the ones commonly used in maritime-port constructions in Spain. Once the caisson has been built, the caisson box is ballasted until the caisson floats, so it can be towed and stockpiled at sea.

The floating concrete caisson (1) in the shape of a straight prism closed at its base, provided with vertical inner cells (18) interconnected with each other and with the exterior, equipped with emptying and filling devices, which enables self-regulation of the ballast level for anchoring at its final location. Specifically, this caisson (1) has a lobular cross section, in a circular arrangement, wherein each of said lobes (11) has a trapezoidal configuration with a curved-convex outer side (12), while the inner side (13) is a portion of a partition that defines a significantly circular central cell (16). Each of these lobes (11) is joined to the adjoining lobe by means of a radial partition (15) and is internally divided into several cells (18) by at least one partition (14) of a significantly circular section, concentric with the central cell (16).

The figures show a caisson with a hexalobular floor plan, i.e., made up of 6 lobes (11), although studies have been carried out determining that this number can vary between 5 and 8 with optimal operation. Each of these lobes (11) has an outer partition wall (12) with a radius of curvature smaller than that of the caisson (1), so that exteriorly the set of lobes that make up the caisson do not form a circular surface of the caisson, which enables optimizing and simplifying the assembly of the walls (12, 13, 14, 15) and reducing the amount of steel required, while the installation thereof is extremely simple since there are no 90° nodes; the inner structure favors the efficient distribution of stresses from the central substructure towards the base, while increasing the support surface at the base (17).

The base (17) of the caisson (1) has a polygonal floor plan and is generally thicker than the walls (12, 13, 14, 15) of the caisson, while at the same time protruding slightly from the floor of the caisson. This base (17) acts as a counterweight in order to lower the center of gravity enabling great flotation stability during the transfer thereof or in anchoring operations.

Optionally, the caisson (1) can be closed temporarily (until it is anchored) by means of a cover (2) or with several covers (2a). FIG. 2 shows a single cover (2) with a configuration equivalent to that of the caisson (1), which in some embodiments may also have a central hole (21), coinciding with the central cell (16) of the caisson, particularly when a connection node has been created in this cell with the mast (3), as can be seen in FIG. 3. On the other hand, FIG. 1 shows several covers (2a), each of which has a surface area equivalent to one or more lobes (11), such that they are easier to remove since they do not need to be moved along the length of the shaft (3). In any case, the cover (2) or covers (2a) are intended to maintain the watertightness of the cells (18) of the caisson while it is towed to the anchoring site and a controlled anchoring of the same is carried out; once this operation is concluded, they are removed from the closing position of the caisson (1) before filling the latter with a ballast material.

The caisson (1) has several communication channels with the exterior (which are not shown), in which a water passage control valve is placed towards the interior of the same during the anchoring process or, if applicable, during the refloating of the foundation. The inner cells are also interconnected with each other by ducts equipped with emptying and filling devices, which enables self-regulation of the ballast level for anchoring at the final location thereof.

FIG. 3 shows a node (19) in a cell (16) for efficiently resisting the stresses to which the whole of the structure mounted on it will be subjected. The node (19) itself is formed only in the upper area of said cell (16), which enables lightening the foundation as a whole and also creating an empty space that is filled with seawater during anchoring in order to stabilize it and contribute to the settlement thereof. An alternative embodiment is possible in which this node takes up the entire cell (16) in which it is manufactured.

The shaft and the connection element can be installed with the caisson afloat by means of cranes, without having to carry out pre-anchoring at port.

Having sufficiently described the nature of the invention, in addition to an example of a preferred embodiment, it is hereby stated for the relevant purposes that the materials, shape, size and layout of the described elements may be modified, provided that it does not imply altering the essential characteristics of the invention claimed below:

The invention claimed is:
1. A gravity-based foundation for installation of offshore wind turbines, manufactured in or on a floating dock for towing to a final location thereof, where the gravity-based foundation is anchored and finally completely submerged below sea level, the gravity-based foundation comprising:
   a base located at a bottom surface of said gravity-based foundation;
   a closing cover or covers for closing or sealing a top surface of said gravity-based foundation;
   a floating concrete caisson, in the shape of a straight prism, closed at said base, provided with vertical inner cells interconnected with each other and with an exterior, equipped with emptying and filling devices; and provided with at least one concrete node in at least one of the cells of the caisson; and
   a circular central cell being provided as an area of connection to a shaft or structure that joins the caisson to the superstructure, to which in turn the wind turbine is fastened,
   wherein said caisson has a lobular cross section in a circular arrangement to provide a plurality of lobes, wherein each of said plurality of lobes has a trapezoidal configuration, with an inner side and a curved-convex outer side, while the inner side is a portion of a partition that defines the circular central cell, each of said plurality of lobes being divided into several cells by at least one partition with a circular cross section, concentric with the circular central cell; the closing cover or covers having a configuration equivalent to the caisson or to each of said plurality of lobes and a support on said caisson that enables the removal of the closing cover or covers once the foundation is anchored, before being filled with a ballast material,
   wherein the base of the caisson has a polygonal floor plan, thicker than walls of the caisson, and protruding slightly from the bottom of the caisson, acting as a counterweight with the aim of lowering the center of gravity, which allows the caisson to be stabilized in flotation, during the transfer thereof or in anchoring operations,
   where each lobe of said plurality of lobes is closed and sealed on the bottom surface of said gravity-based foundation by the base, and
   wherein each lobe of said plurality of lobes is only open at the top of said gravity-based foundation.

2. The foundation according to claim 1, wherein the closing cover or covers do not cover the circular central cell in which the mast is fastened, particularly when a node has been formed in said cell for the fastening of the shaft.

3. The foundation according to claim 1, wherein the closing cover or covers do not cover the circular central cell in which the mast is fastened, particularly when a node has been formed in said cell for the fastening of the shaft.

4. The foundation according to claim 1, wherein a radius of curvature of each of the plurality of lobes into which the floor plan is divided is smaller than a radius of the body of the foundation.

5. The foundation according to claim 1, wherein a radius of curvature of each of the plurality of lobes into which the floor plan is divided is smaller than a radius of the body of the foundation.

6. The foundation according to claim 2, wherein a radius of curvature of each of the plurality of lobes into which the floor plan is divided is smaller than a radius of the body of the foundation.

7. The foundation according to claim 3, wherein a radius of curvature of each of the plurality of lobes into which the floor plan is divided is smaller than a radius of the body of the foundation.

8. The foundation according to claim 1, wherein the number of said plurality of lobes is comprised between 5 and 8.

9. The foundation according to claim 1, wherein the number of said plurality of lobes is comprised between 5 and 8.

10. The foundation according to claim 2, wherein the number of said plurality of lobes is comprised between 5 and 8.

11. The foundation according to claim 3, wherein the number of said plurality of lobes is comprised between 5 and 8.

12. The foundation according to claim 4, wherein the number of said plurality of lobes is comprised between 5 and 8.

13. The foundation according to claim 5, wherein the number of said plurality of lobes is comprised between 5 and 8.

14. The foundation according to claim 6, wherein the number of said plurality of lobes is comprised between 5 and 8.

15. The foundation according to claim 7, wherein the number of said plurality of lobes is comprised between 5 and 8.

16. The foundation according to claim 1, wherein the caisson has a hexalobular floor plan.

17. The foundation according to claim 1, wherein the caisson has a hexalobular floor plan.

18. The foundation according to claim 2, wherein the caisson has a hexalobular floor plan.

19. The foundation according to claim 15, wherein the caisson has a hexalobular floor plan.

20. The foundation according to claim 1, wherein
said at least one concrete node is located in the centermost cell of said at least one of the cells of the caisson,
said at least one concrete node extends from at least the top of said gravity-based foundation towards said bottom surface of said gravity-based foundation, and said at least one concrete node does not extend more than half the distance between the top of said gravity-based foundation to said bottom surface of said gravity-based foundation.

* * * * *